US009699513B2

(12) United States Patent
Cowper et al.

(10) Patent No.: US 9,699,513 B2
(45) Date of Patent: Jul. 4, 2017

(54) METHODS AND APPARATUS FOR PROVIDING ACCESS TO CONTENT

(75) Inventors: Jonathan R. Cowper, San Antonio, TX (US); Benjamin Kryczka, San Antonio, TX (US); Larry B. Pearson, San Antonio, TX (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 13/486,868

(22) Filed: Jun. 1, 2012

(65) Prior Publication Data

US 2013/0326570 A1    Dec. 5, 2013

(51) Int. Cl.
| | | |
|---|---|---|
| *H04N 21/81* | (2011.01) | |
| *H04N 21/4725* | (2011.01) | |
| *H04N 21/478* | (2011.01) | |
| *H04N 21/858* | (2011.01) | |
| *H04N 21/4784* | (2011.01) | |
| *H04N 21/4788* | (2011.01) | |
| *H04N 21/41* | (2011.01) | |
| *H04N 21/475* | (2011.01) | |

(52) U.S. Cl.
CPC ..... *H04N 21/4725* (2013.01); *H04N 21/4758* (2013.01); *H04N 21/4781* (2013.01); *H04N 21/4784* (2013.01); *H04N 21/4788* (2013.01); *H04N 21/47815* (2013.01); *H04N 21/812* (2013.01); *H04N 21/8583* (2013.01); *H04N 21/4126* (2013.01)

(58) Field of Classification Search
CPC .. H04N 21/458; H04N 21/435; H04N 21/812; H04N 21/23424; H04N 21/25841; H04N 21/25875; H04N 21/4316; H04N 21/43424; H04N 21/44204; H04N 21/44016; H04N 21/23406; H04N 21/4622; H04N 21/4126; H04N 21/25891; H04N 21/442; H04N 21/4532; H04N 21/41407; H04N 21/234363; H04N 21/4725; H04N 21/4758; H04N 21/4781; H04N 21/8583; H04N 21/4784; H04N 21/4788; H04N 21/47815
USPC .................................. 725/25, 45, 80, 32–36
See application file for complete search history.

(56) References Cited

U.S. PATENT DOCUMENTS

| | | | |
|---|---|---|---|
| 7,945,653 B2 | 5/2011 | Zuckerberg et al. | |
| 8,036,514 B2 | 10/2011 | Barton et al. | |

(Continued)

*Primary Examiner* — Benjamin R Bruckart
*Assistant Examiner* — Aklil Tesfaye
(74) *Attorney, Agent, or Firm* — Dority & Manning, P.A.

(57) ABSTRACT

A system that incorporates teachings of the subject disclosure may include, for example, a method for a method for transmitting, by a first system including at least one first processor, to a second system including at least one second processor, a tag retrieved by the first system from a stream associated with a media program that is received by the first system, identifying, by the second system, a plurality of records associated with the tag, determining, by the second system, a temporal characteristic of the tag according to a comparison of a scheduled presentation time of the media program and a time of receipt of the tag, selecting, by the second system, a record from the plurality of records according to the temporal characteristic, and transmitting, by the second system, content information retrieved from the record selected from the plurality of records. Other embodiments are disclosed.

19 Claims, 18 Drawing Sheets

(56) References Cited

U.S. PATENT DOCUMENTS

| | | | |
|---|---|---|---|
| 8,249,563 B1* | 8/2012 | Myers | 455/414.1 |
| 2002/0194592 A1* | 12/2002 | Tsuchida et al. | 725/32 |
| 2005/0278747 A1* | 12/2005 | Barton et al. | 725/58 |
| 2006/0177200 A1* | 8/2006 | Deutmeyer | H04N 5/76 386/241 |
| 2007/0011256 A1* | 1/2007 | Klein | G06F 17/30905 709/206 |
| 2007/0113240 A1* | 5/2007 | McLean et al. | 725/8 |
| 2007/0180488 A1 | 8/2007 | Walter | |
| 2007/0204288 A1* | 8/2007 | Candelore | 725/28 |
| 2007/0234213 A1* | 10/2007 | Krikorian | H04N 21/23406 715/716 |
| 2007/0234397 A1 | 10/2007 | Pearson | |
| 2008/0129864 A1* | 6/2008 | Stone et al. | 348/468 |
| 2008/0148336 A1 | 6/2008 | Walter | |
| 2008/0263581 A1* | 10/2008 | Turner | H04N 21/235 725/22 |
| 2008/0281805 A1 | 11/2008 | Xiaolu et al. | |
| 2009/0210901 A1* | 8/2009 | Hawkins et al. | 725/34 |
| 2009/0304351 A1* | 12/2009 | Paila et al. | 386/95 |
| 2010/0325653 A1* | 12/2010 | Matz | 725/28 |
| 2011/0078721 A1* | 3/2011 | Wang et al. | 725/25 |
| 2011/0083149 A1* | 4/2011 | Picucci | H04N 5/76 725/39 |
| 2011/0167440 A1* | 7/2011 | Greenfield | 725/25 |
| 2011/0283309 A1* | 11/2011 | Bliss et al. | 725/25 |
| 2012/0180083 A1* | 7/2012 | Marcus | 725/32 |
| 2012/0210349 A1* | 8/2012 | Campana et al. | 725/32 |
| 2013/0117406 A1* | 5/2013 | Chevillat et al. | 709/217 |
| 2013/0205212 A1* | 8/2013 | Sinha | G06T 1/0021 715/719 |
| 2013/0263182 A1* | 10/2013 | Ivy et al. | 725/34 |

\* cited by examiner

300

400

Sports Illustration
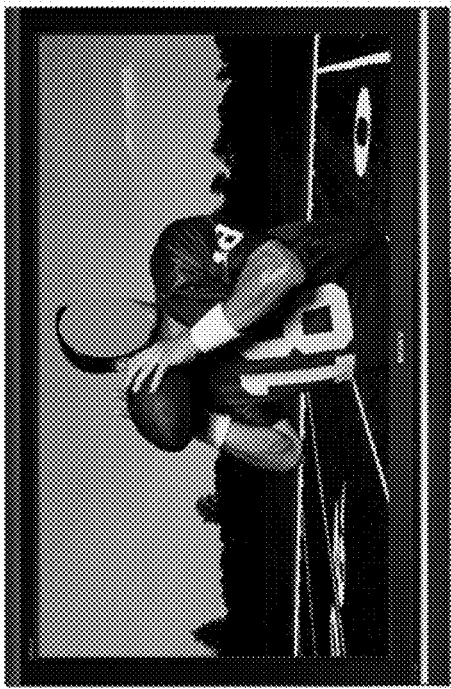
Program contains close-caption "invisible" Tags
Tags are inserted by announcing crew during the program
Smartphone or Tablet
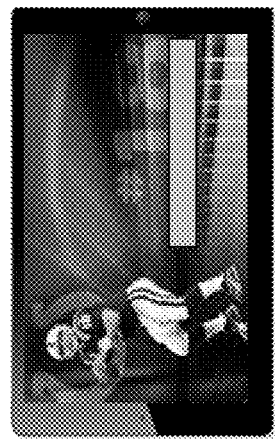
Features:
- Stats
- Career highlights
- Instant Replay
- Fantasy Football updates
- Charities supported
- Merchandise available
- Tickets
FIG. 9

Enhanced Content
Program contains close-caption "invisible" Tags
Tags are inserted by production company
Smartphone or Tablet
Features:
- Full Cast & Credits
- Filmography
- Merchandise available
- Soundtracks
- Downloads
FIG. 10

Game Show
Tags are inserted by production company
Push Tags drive letters to populate the app
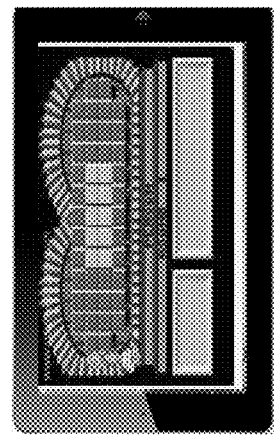
Smartphone or Tablet
Features:
- User keys in input
- Play on TV drives the app
- User Rankings
FIG. 11

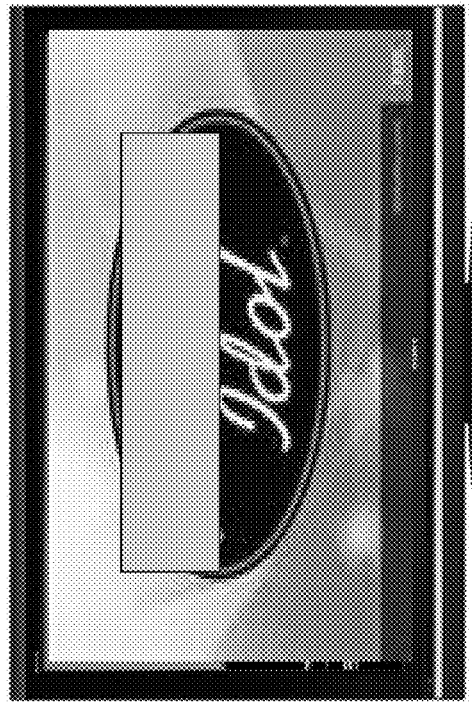
Contest Show
Program contains close-caption "invisible" Tags
Tags are inserted by program editors during the broadcast
Smartphone or Tablet
To Vote
FOR
Sam
Touch here
Features:
• Personal info
• Home Town
• Vote
• Songs to purchase
FIG. 12

Social Illustration
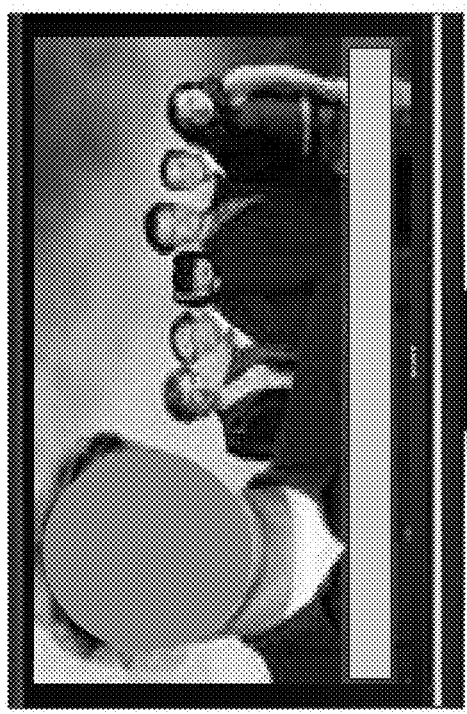
TV show contains close-caption "invisible" Tags
2-way communication via Internet
Smartphone or Tablet
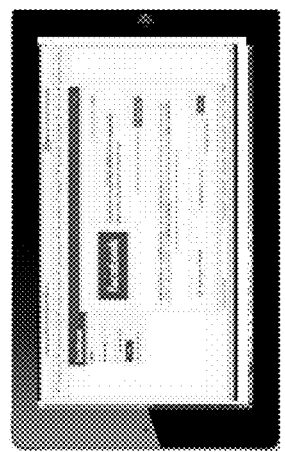
Features:
- Link to social network
- Presence
- Likes
- Update feeds
- Status
- Twitter feeds
FIG. 13

In-Show Purchase Illustration
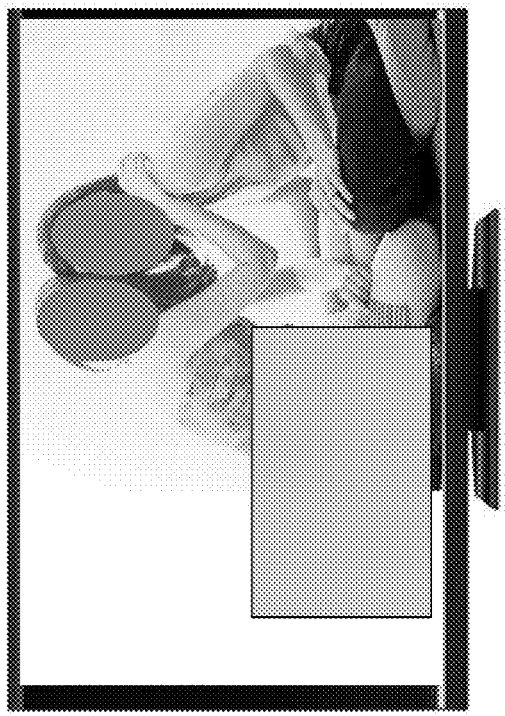
Tags are inserted by production company
Service provider sells "tags" in the same manner as commercials
Smartphone or Tablet
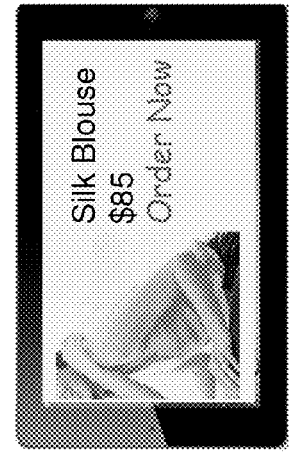
Silk Blouse
$85
Order Now
Features:
- Lawn Furniture
- Clothing
- Hair stylists
- Soundtracks
- Nothing is shown on the main TV
FIG. 14

Impulse purchase Illustration
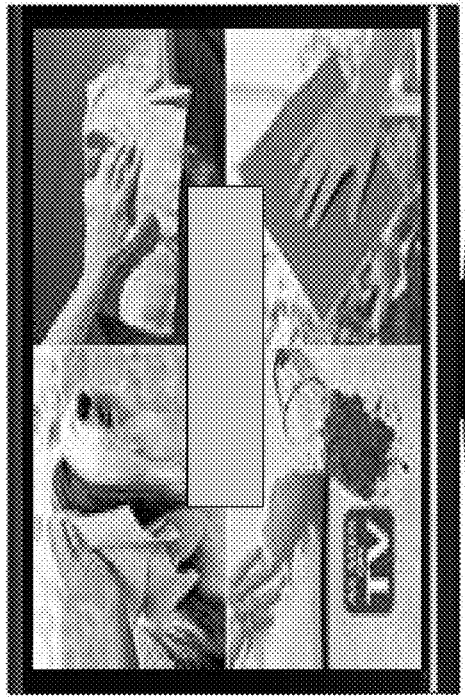
Tags are inserted by production company
Service provider sells "tags" in the same manner as commercials
Features:
- Typically items under $50
- Purchase is through preferences set in app
- Nothing is shown on the main TV
Smartphone or Tablet
FIG. 15

Coupon Illustration
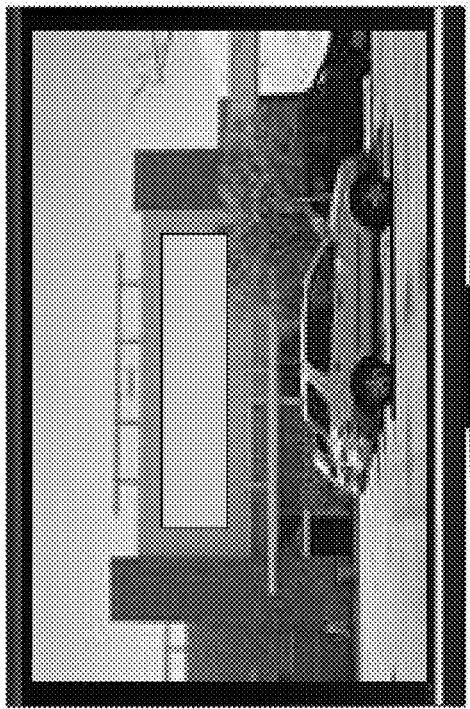
Tags are inserted by production company
Service provider sells "tags" in the same manner as commercials
Smartphone or Tablet
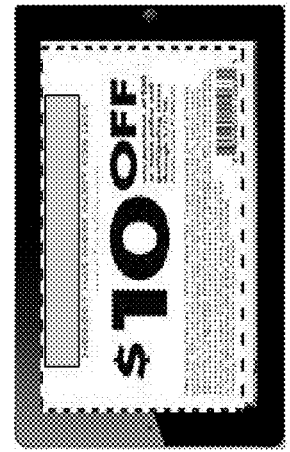
Features:
- Add to "My Wallet"
- Redeem at retail stores
FIG. 16

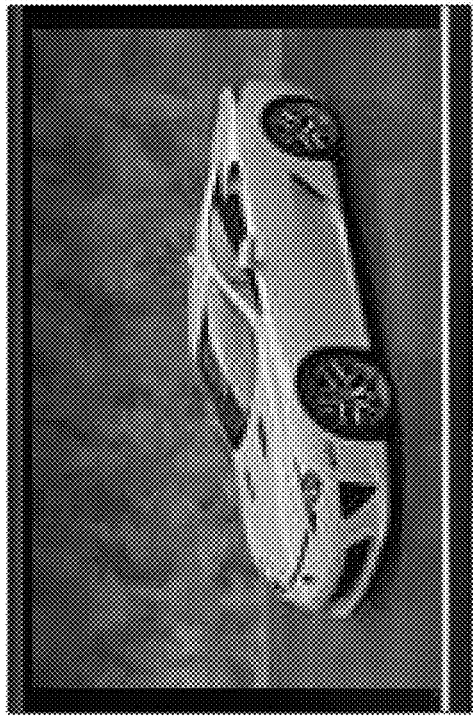
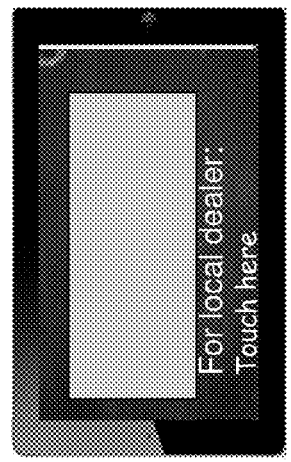
FIG. 17

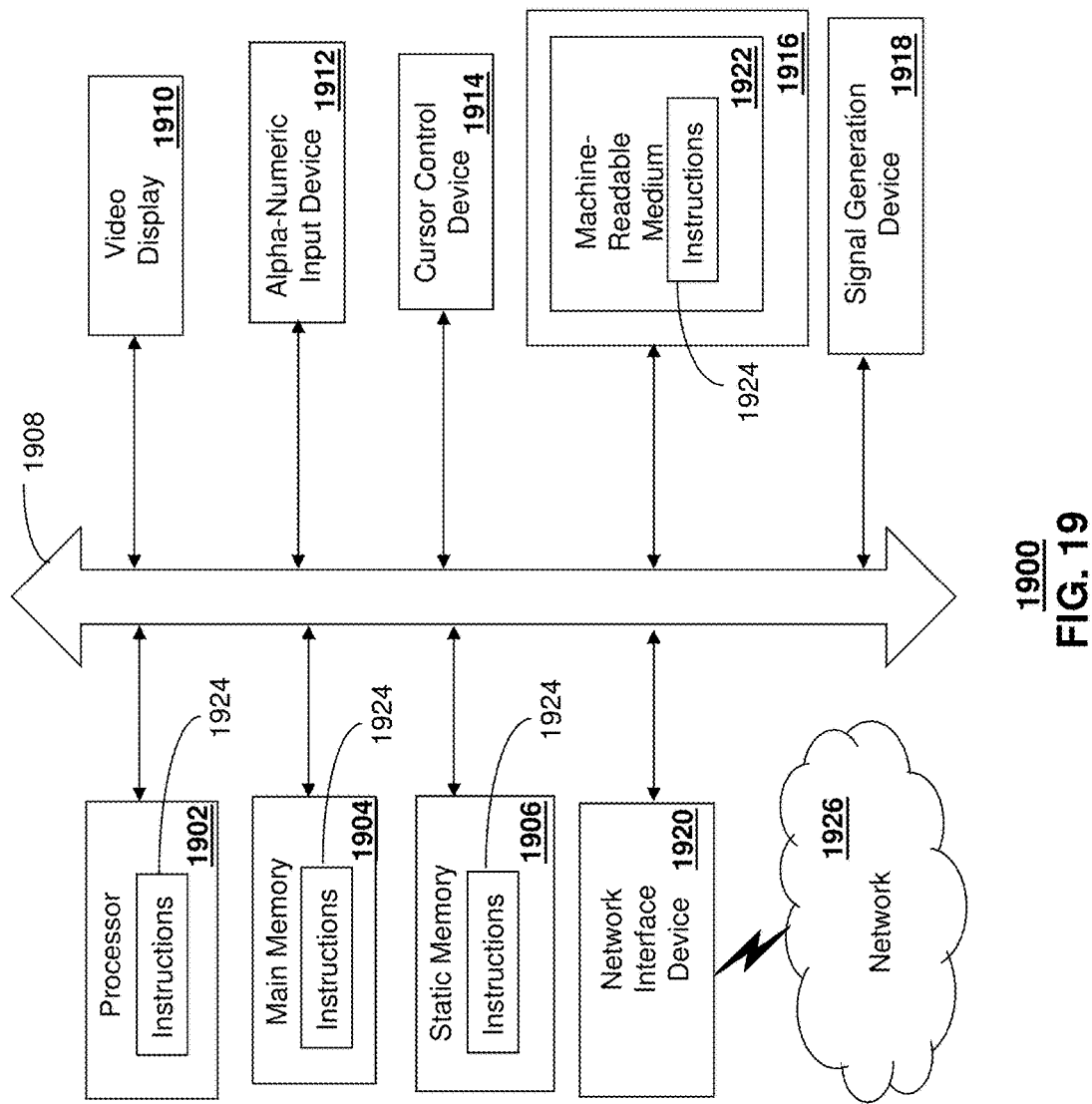

METHODS AND APPARATUS FOR PROVIDING ACCESS TO CONTENT

FIELD OF THE DISCLOSURE

The subject disclosure relates to methods and apparatus for providing access to content.

BACKGROUND

Service providers of media content such as television programs can offer consumers hundreds of channels to view programs. Frequently, more than one instance of the same television program can be viewed on more than one channel at different scheduled times. Generally, viewers rely on an electronic programming guide to identify the viewing times of programs that are desirable to them. Viewers can also search for programs based on genre, title, or other search terms to select and schedule recordings of media programs. This can be useful to viewers who are unable to view media programs during their scheduled intervals.

BRIEF DESCRIPTION OF THE DRAWINGS

Reference will now be made to the accompanying drawings, which are not necessarily drawn to scale, and wherein:

FIGS. 8-17 depict illustrative embodiments of content enhanced applications resulting from the method of FIG. 7;

FIG. 19 is a diagrammatic representation of a machine in the form of a computer system within which a set of instructions, when executed, may cause the machine to perform any one or more of the methods described herein.

DETAILED DESCRIPTION

The subject disclosure describes, among other things, illustrative embodiments of methods and apparatus for providing access to supplemental content according to temporal or other characteristics of tags supplied with primary content. Other embodiments can be used in the subject disclosure.

One embodiment of the subject disclosure includes a device including a memory storing computer instructions, and a processor coupled to the memory. The processor, responsive to executing the computer instructions, can perform operations including receiving from a set-top box a tag retrieved from a closed captioned stream of a media program presented by the set-top box, identifying a plurality of records associated with the tag, determining a temporal characteristic of the tag, selecting a record from the plurality of records according to the temporal characteristic, and transmitting content information retrieved from the selected record to a communication device in a vicinity of the set-top box for presenting content related to the media program.

One embodiment of the subject disclosure includes a computer-readable storage medium, including computer instructions which, responsive to being executed by at least one processor, cause the at least one processor to perform operations including receiving from a communication device a tag retrieved from a closed captioned stream of a media program, identifying a plurality of records associated with the tag, identifying a temporal characteristic from a comparison of a time of receipt of the tag and a presentation schedule of the media program, selecting a record from the plurality of records according to the temporal characteristic, and transmitting to the communication device content information retrieved from the record.

One embodiment of the subject disclosure includes a method for transmitting, by a first system including at least one first processor, to a second system including at least one second processor, a tag retrieved by the first system from a stream associated with a media program that is received by the first system, identifying, by the second system, a plurality of records associated with the tag, determining, by the second system, a temporal characteristic of the tag according to a comparison of a scheduled presentation time of the media program and a time of receipt of the tag, selecting, by the second system, a record from the plurality of records according to the temporal characteristic, and transmitting, by the second system, content information retrieved from the record selected from the plurality of records.

Figure 1:
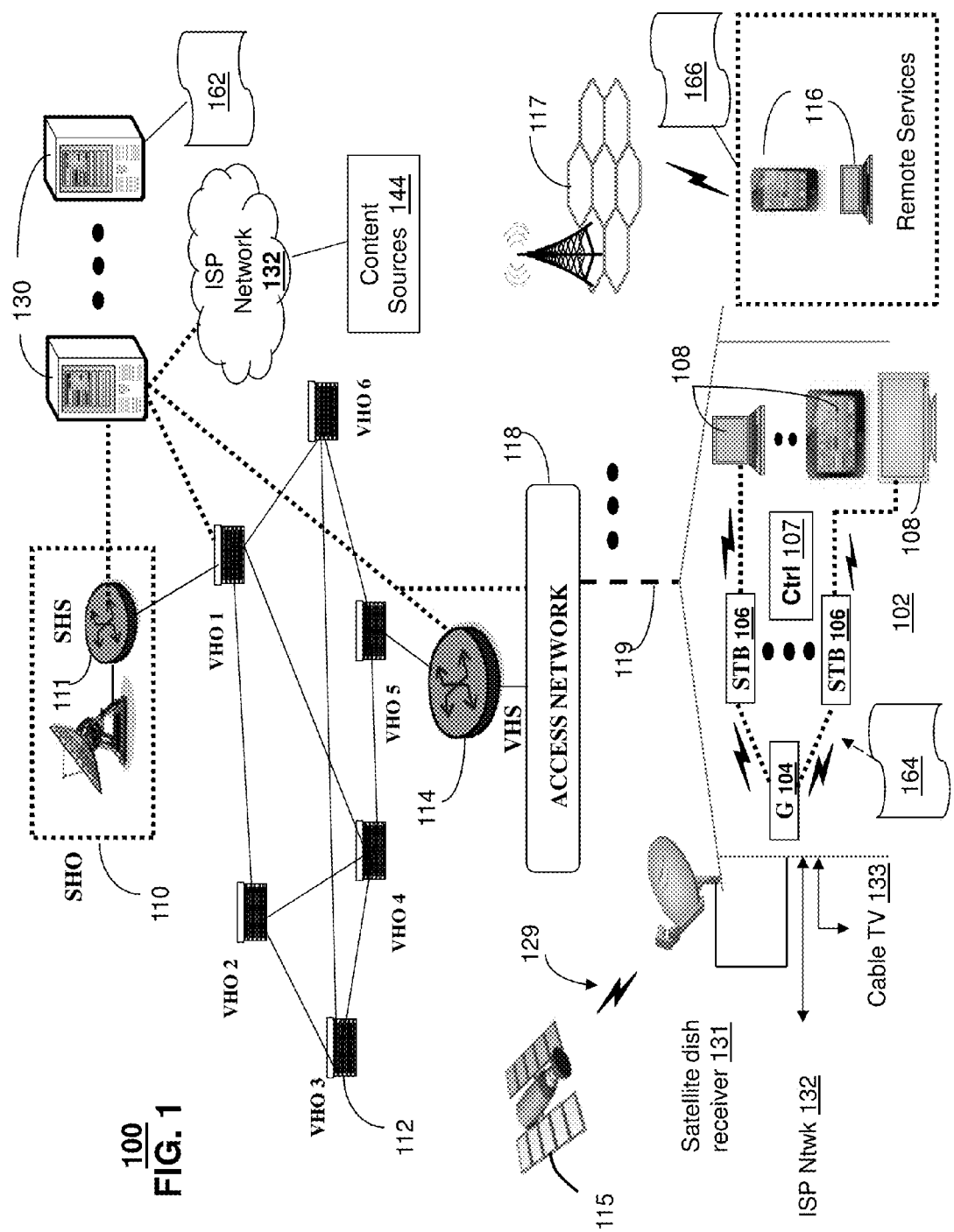
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller, a PC, laptop, phone, or tablet).

The gateway 104, the media processors 106, and media devices 108 can utilize tethered communication technologies (such as coaxial, powerline, Ethernet or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

In another embodiment, content sources 144 can supply content over the ISP 132 to devices such as the media processor 106, and/or media devices 108 and 116. Content sources 144 can represent streaming services from companies such as Hulu™, Netflix™, YouTube™ a service of Google™, or downloadable content from iTunes™ a service of Apple™, or other suitable streaming or downloadable content services. In yet another embodiment, content can be provided by way of over-the-air broadcast of HDTV signals or by way of data services of a cellular telephone network.

The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communication devices 116.

Communication system 100 can also provide for all or a portion of the computing devices 130 to function as a server (herein referred to as server 130). The server 130 can use computing and communication technology to perform function 162, which can include among other things, analyzing a temporal aspect of tags, among other characteristics, and providing access to supplemental content to viewing devices of FIG. 1. The media processors 106 and wireless communication devices 116 can be provisioned with software functions 164 and 166, respectively, to utilize the services of server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments the subject disclosure.

Figure 2:
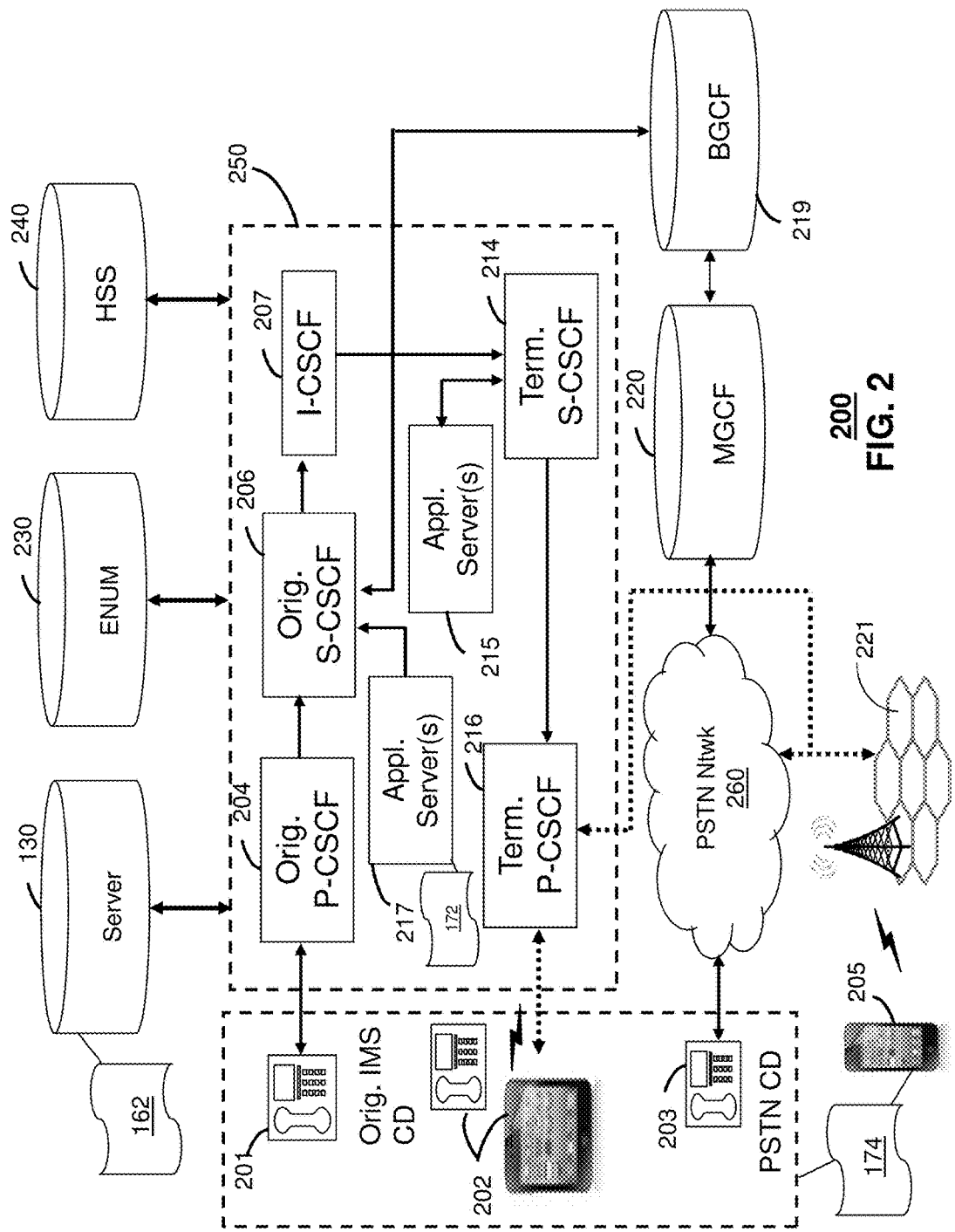

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies can be used in one or more embodiments of the subject disclosure. Accordingly, multiple wireline and wireless communication technologies can be used by the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 1 can be operably coupled to the second communication system 200 for purposes similar to those described above. Server 130 can perform function 162 and thereby provide supplemental content services to the CDs 201, 202, 203 and 205 of FIG. 2. CDs 201, 202, 203 and 205, which can be adapted with software to perform function 174 to utilize the services of the server 130. Server 130 can be an integral part of the application server(s) 217 performing function 172, which can be substantially similar to function 162 and adapted to the operations of the IMS network 250.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 3:
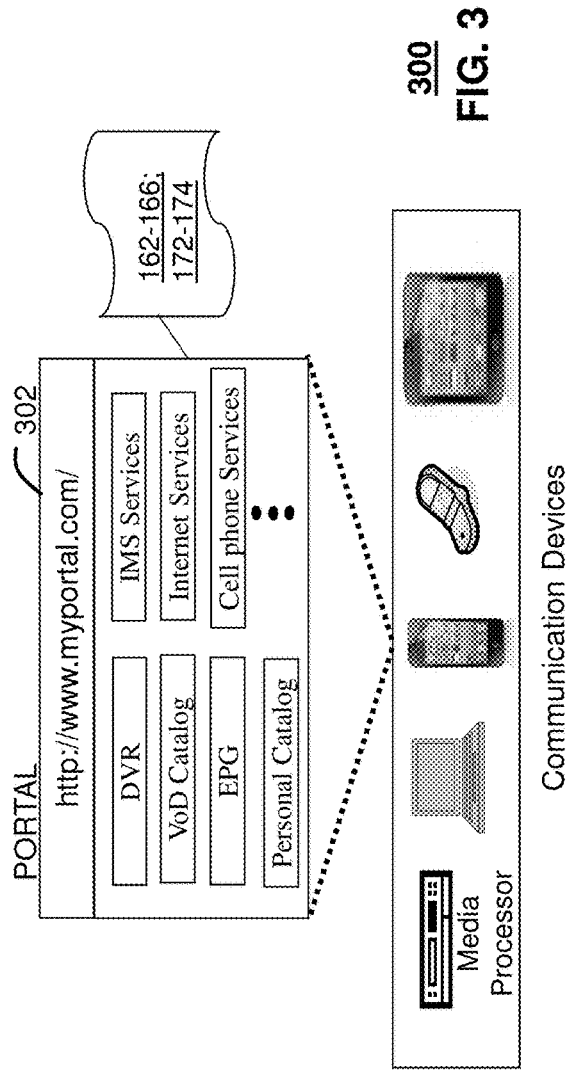
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

The web portal 302 can further be utilized to manage and provision software applications 162-166, and 172-174 to adapt these applications as may be desired by subscribers and service providers of communication systems 100-200.

Figure 4:
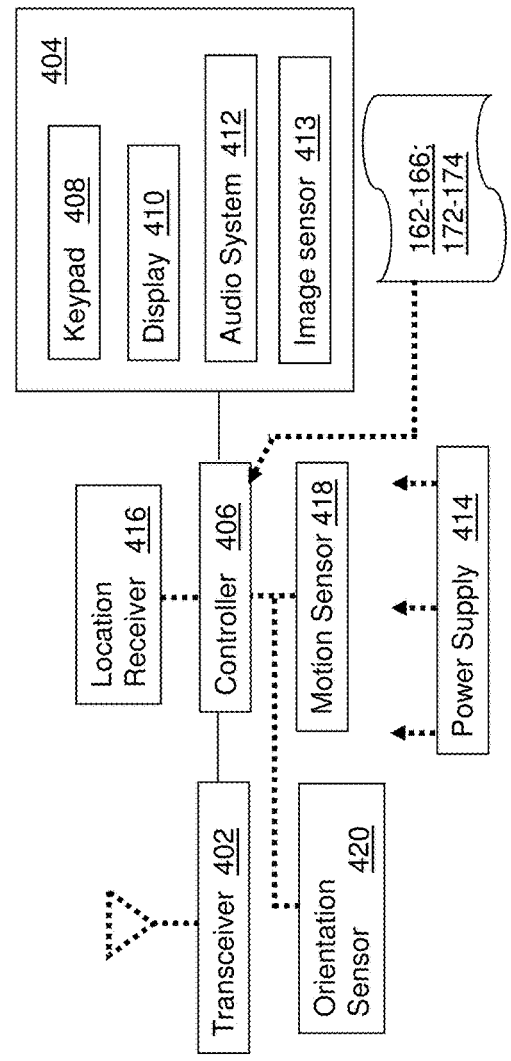
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used control the manipulation of the GUI elements. The display 110 can be an integral part of the housing assembly of the communication device 100 or an independent device communicatively coupled thereto by a tethered wireline interface (such as a cable) or a wireless interface.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, the charging system can utilize external power sources such as DC power supplied over a physical interface such as a USB port or other suitable tethering technologies.

The location receiver 416 can utilize common location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies for executing computer instructions, controlling and processing data supplied by the aforementioned components of the communication device 100.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 as depicted by the hash lines. These variant embodiments can be used in one or more embodiments of the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other devices that can operate in communication systems 100-200 of FIGS. 1-2 such as a gaming console and a media player.

The communication device 400 shown in FIG. 4 or portions thereof can serve as a representation of one or more of the devices of communication systems 100-200. In addition, the controller 406 can be adapted in various embodiments to perform the functions 162-166 and 172-174, respectively.

Figure 5:
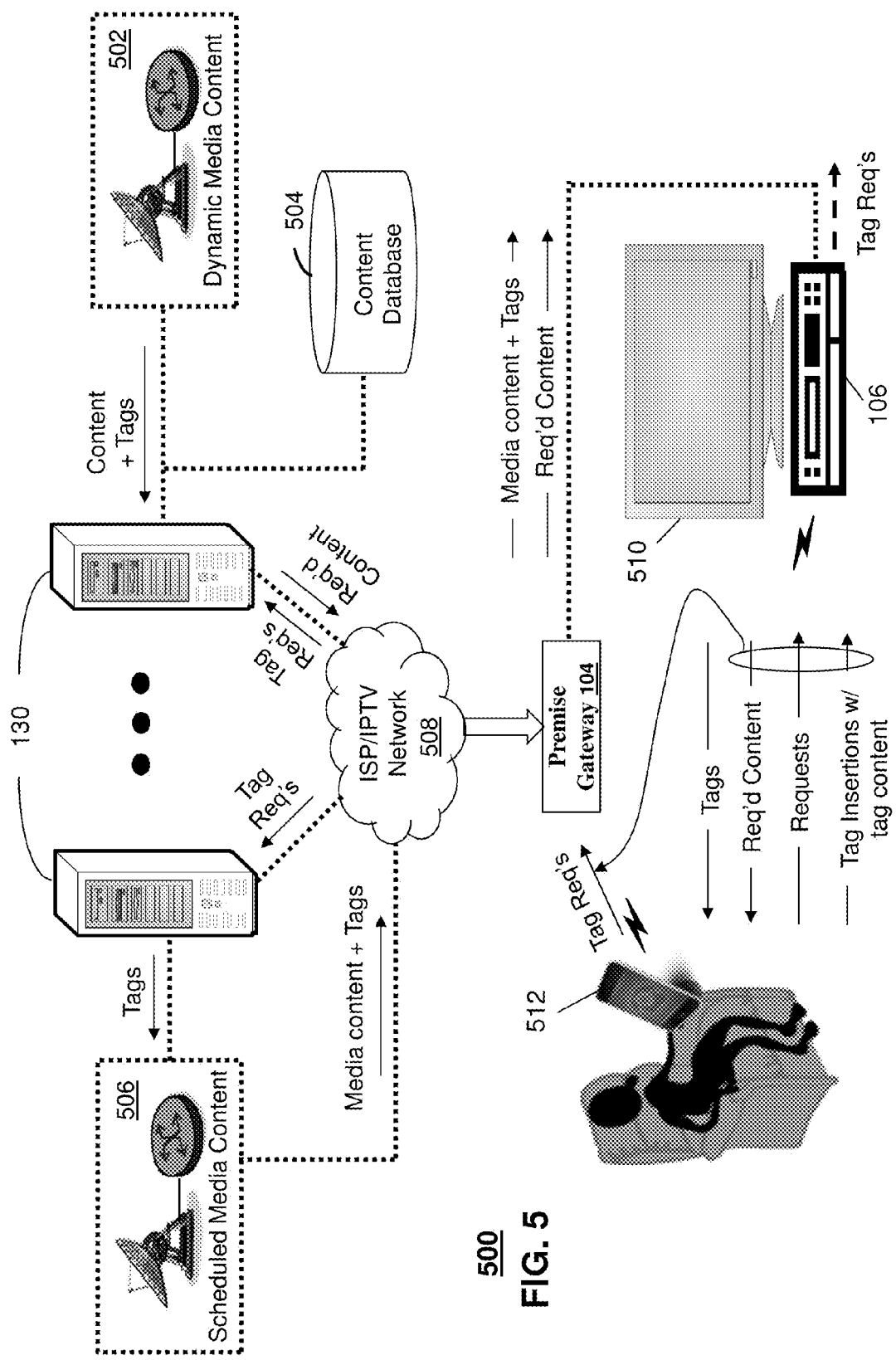
FIG. 5 depicts an illustrative embodiment of a system for distributing content.
Figure 6:
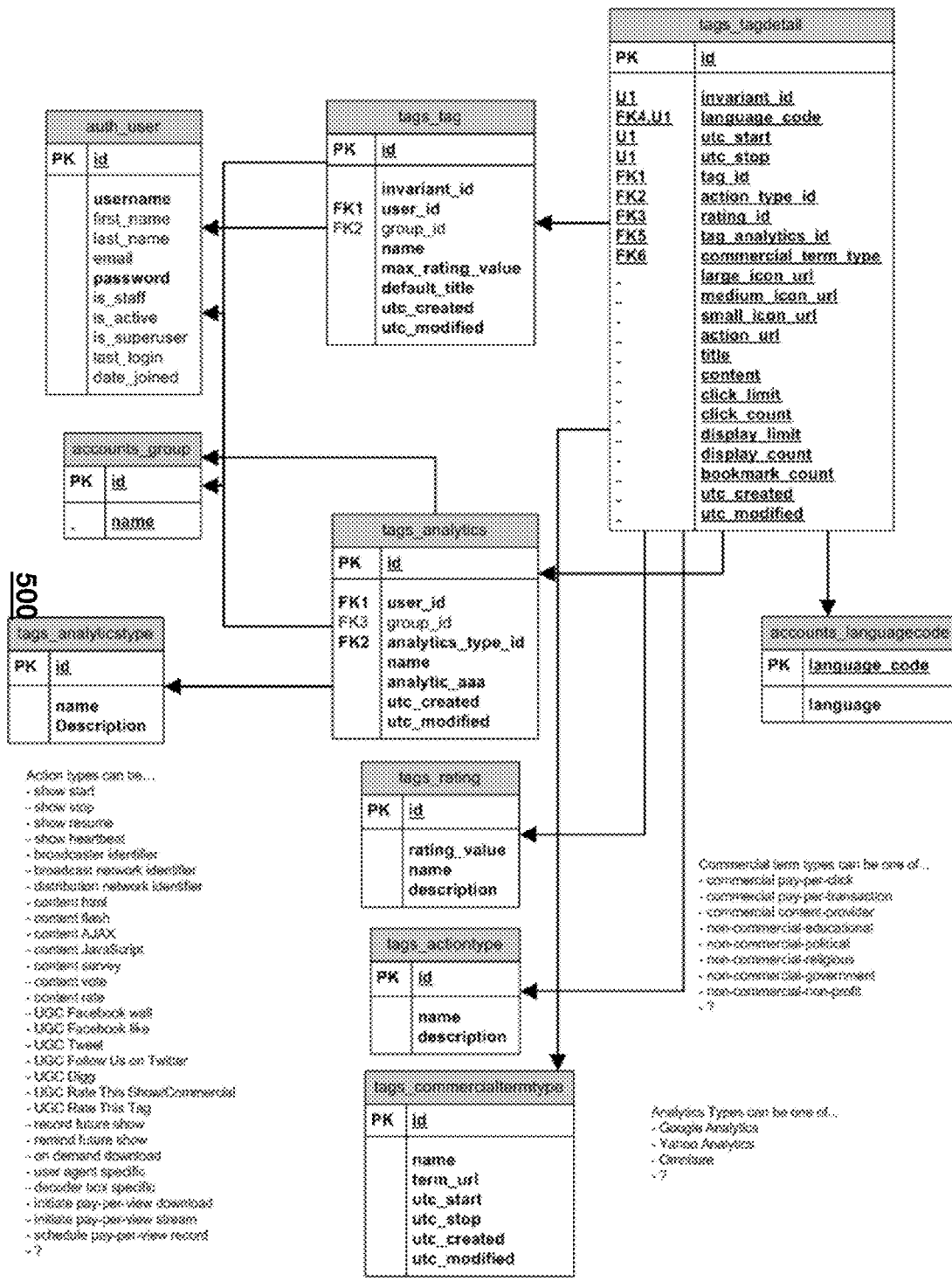
FIG. 6 depicts an illustrative embodiment of a relational database that can be utilized by the system of FIG. 5.

FIG. 5 depicts an illustrative embodiment of a system 500 for providing access to supplemental content according to temporal and/or other characteristics of tags supplied with primary content. System 500 can comprise a dynamic media content source 502 that provides content and associated tags to server 130. The content can be stored in a content database 504 accessible to the server 130. The content database 504 can be a relational database configuration as shown in FIG. 6. The tags can be represented by hash numbers which can be used as invariant identifiers (IDs) that can be used by the server 130 to identify content in the content database 504. The tags provided by the dynamic media content source 502 can be inserted by the server 130 in a media content stream supplied by a scheduled content source 506.

The tags can be inserted in a closed captioned stream transmitted with the media program, in metadata supplied with the media program, in segments of the media program, or combinations thereof. The insertion of tags can also vary by the video encoding protocol used. Tags can also be inserted in audio streams, still images, files, or other suitable content types and formats for delivering media content. The scheduled media content source 506 can also provide media content with pre-inserted tags in the closed captioned stream or the media program stream. The media content and tags supplied by the scheduled media content source 508 can be distributed by way of an ISP and IPTV network 508 to a premises gateway 104. The premises gateway 104 can distribute the content to a media processor 106, which presents it by way of a presentation device 510. A viewing device 512, such as a touch-screen tablet, can be configured to retrieve tags received by the media processor 106 by way of a WiFi wireless interface of the media processor 106. The viewing device 512, for instance, can submit a request to the media processor 106 by way of the WiFi interface to forward all tags in they are received by the media processor 106.

Upon receiving tags from the media processor 106, the viewing device 512 can send tag requests with the retrieved tags to the server 130 via the premise gateway 104 and ISP/IPTV network 508. The server 130 can determine a temporal characteristic of the received tags along with other characteristics to identify in the content database 504 content information associated with the tags. The content information can then be transmitted by the server 130 to the viewing device 512 by way of the wireless interface of the media processor 106 or the premises gateway 104. The viewing device 512 can also be configured to request insertion of tags with supplemental content. In this configuration, the viewing device 512 performs the function of a dynamic media content provider. This latter embodiment can be used in a social networking environment.

Figure 7:
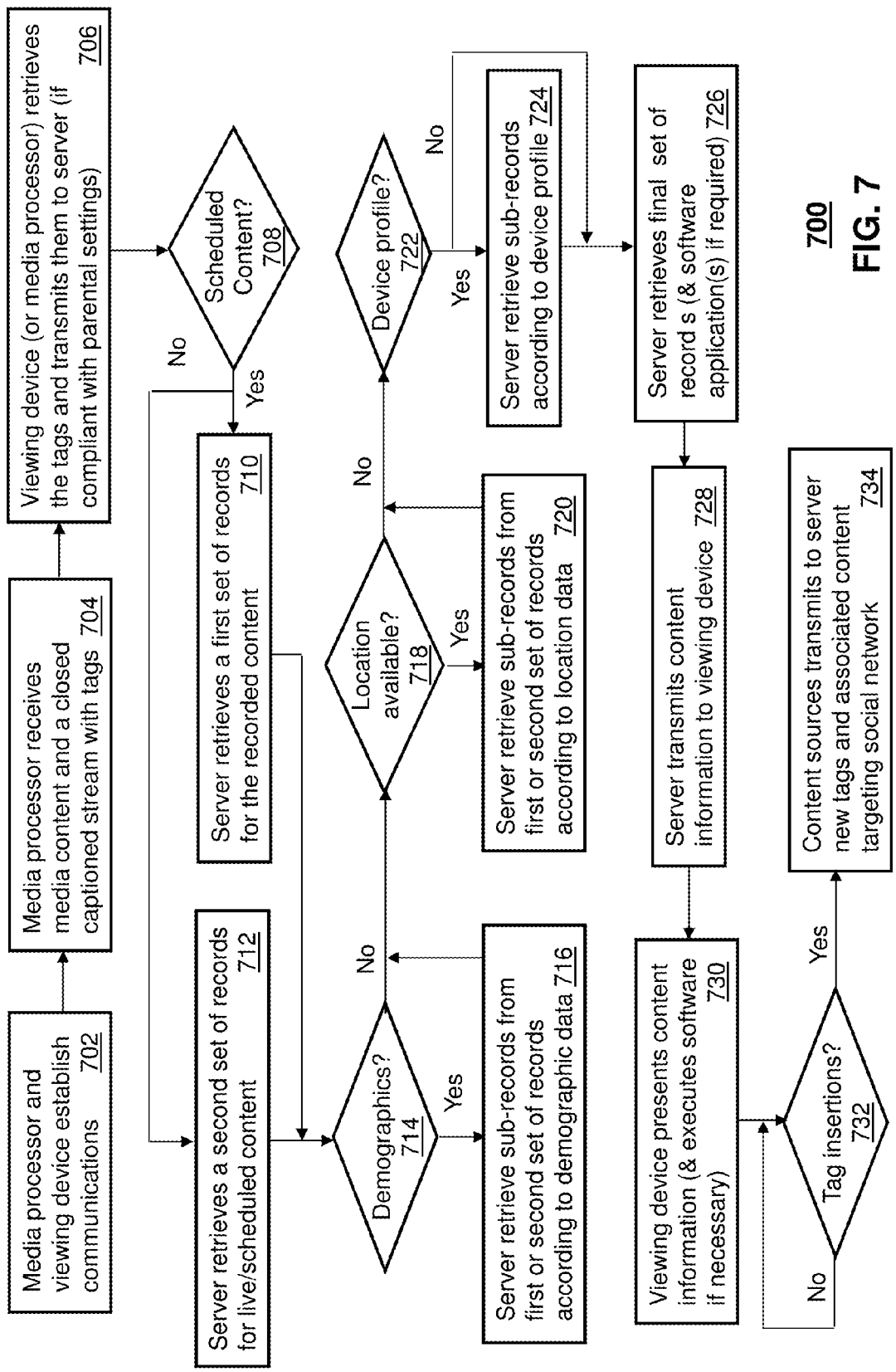
FIG. 7 depicts an illustrative embodiment of a method operating in portions of the systems described in FIGS. 1-6.

FIG. 7 depicts an illustrative method 700 that operates in portions of the devices of FIGS. 1-5. Method 700 can begin with step 702 in which a media processor 106 and viewing device 512 establish communications by way of, for example, a wireless interface between them as shown in FIG. 5. In step 704 the media processor 106 receives media content and a closed captioned streamed with tags. In one embodiment, the viewing device 512 can retrieve the tags and transmit them to the server 130 for accessing supplemental content. In one embodiment, the viewing device 512 can be configured with parental controls to prevent certain tags from being retrieved from the closed captioned stream. The parental controls can prevent tags from being retrieved based on a time-of-day setting, rating of the media content (e.g., tags can only be retrieved for G-rated content), and so on. In one embodiment, the parental controls can be established at the media processor 106. In this embodiment, the media processor 106 can prevent the viewing device 512 from retrieving tags according to parental control settings. In one embodiment, the media processor 106 can retrieve the tags on behalf of the viewing device 512 and transmit them to the server 130. In this embodiment, when content information is received by the media processor 106 that is supplied by the server 130, such content is transmitted to the viewing device 512 over the wireless interface established between them.

Upon receiving tags from the viewing device 512 or the media processor 106, the server 130 at step 708 can determine if the tag is associated with scheduled content or recorded content. The server 130 can accomplish this step by determining a media program associated with an identifier of the tag and compare a known scheduled viewing time of the media program with a time when the tag was received. For instance, suppose the tag was received by the server 130 at 8:10 pm Central time. Further suppose that the server 130 determines according to the identifier that the media program is "House" and that the scheduled viewing time is from 8 pm Central time to 9 pm Central time. Since the time the tag was received overlaps with the scheduled viewing time of the media program, then the server 130 can determine that the media program is being presented during its presentation schedule. If the time the tag was received does not overlap with the scheduled viewing time of the media program (e.g., the tag was received at 10:15 pm Central time), then the server 130 can determine that the media program is being presented from a recorded copy provided by a digital video recorder (DVR) of the media processor 106 or a DVR accessible by the media processor 106 in the premises.

If the tag is received from recorded content, then the server 130 proceeds to step 710 where it retrieves a first set of records from the content database 504. If the tag is received from scheduled or live content, then the server 130 proceeds to step 712 where it retrieves a second set of records from the content database 504. The first set of records differs from the second set of records. For instance, the first set of records can identify first supplemental content chosen by a content provider for recorded content, while the second set of records can identify second supplemental content chosen for scheduled or live media programs, the first supplemental content and the second supplement content being different from each other. The content provider can choose to provide supplemental content for recorded content that targets consumers in a manner different from supplemental content chosen for consumers viewing scheduled media content to target the consumers based to differentiate based on time of viewing and perhaps context of how the consumer chose to view the program.

Each of the first or second records can include sub-records that can be selected according to demographic information, location information, device profile information, or combinations thereof. Demographic information can be determined for consumers by accessing a subscriber account of the consumer that is accessible by server 130. The subscriber account may identify gender, age, income bracket, credit rating, and so on. The location information can be retrieved by the server 130 from a location services server that tracks the location of the consumer. The location services server can identify the location of the consumer according to location information such as GPS information supplied by devices of the consumer including the viewing device 512, premises address retrieved from a subscriber account, or other suitable techniques for determining a consumer's location. The device profile information of the viewing device 512 can be retrieved by the server 130 from information supplied by the viewing device 512 sent along with the tag request, from an analysis of subscriber account information, or other suitable techniques to identify features of the viewing device 512. The features of the viewing device 512 that can affect a selection of records according to, for example, a presentation resolution of the viewing device 512, audio resources of the viewing device 512, software applications (e.g., Java™, OS, etc.) used by the viewing device 512, and so on.

If the server 130 determines at step 714 that demographic information is available, the server 130 can proceed to step 716 and retrieve sub-records from the first or second records (depending on the outcome of step 708) according to demographic data accessed by the server 130. If the server 130 determines at step 718 that location information is available, the server 130 can proceed to step 720 and retrieve sub-records from the first or second records according to location data provided to the server 130. In step 720, the remaining records after step 716 (if executed by the server 130) are used by the server 130 to select a subset of records according to location data. If the server 130 determines at step 722 that device profile information is available, the server 130 can proceed to step 724 and retrieve sub-records according to device profile provided to the server 130. In step 724, the remaining records after step 716 and/or step 720 (if executed by the server 130) are used by the server 130 to select a subset of records according to device profile data.

At step 726, the server 130 retrieves a final set of records and software application(s) if required. The final set of records can represent a single record or multiple records depending on how the records were filtered by steps 708, 714, 718, and/or 722. The software application(s) can represent software executable by the viewing device 512 that may complement or enhance a presentation of content identified in the final set of records. The software can be selected at step 724 according to the resources of the viewing device 512 identified by the device profile. At step 728, the server 130 can transmit content information to the viewing device 512. The content information can represent pointers retrievable or accessible by the viewing device 512. The pointers can be URL or URI data provided to the viewing device 512 by the server 130. At step 730, the viewing device 512 can present content information retrieved or accessed with the content pointers and execute software applications if necessary to enhance the presentation of the content.

Figure 8:

FIG. 8 shows illustrative embodiments for primary and secondary presentation devices. FIGS. 9-17 provide illustrative embodiments for presenting supplemental content. FIG. 9, for example, presents an illustration of supplemental content presented at viewing device 512 (e.g., a smartphone or touch-screen tablet) with features such as statistics, career highlights, instant replays, fantasy football updates, charities supported, merchandise available, tickets, and so on. It should be noted that the features presented can be interactive features, which the viewing device 512 can select with user input. FIG. 10 presents an illustrative embodiment of supplemental content of a specific media program with accompanying presentation features such as ebook options, film history, etc.

FIG. 11 presents an illustrative embodiment of supplemental content of a game show with accompanying presentation features. FIG. 12 presents an illustrative embodiment of supplemental content of a contest show with accompanying presentation features. FIG. 13 presents an illustrative embodiment of supplemental content of a media show with accompanying presentation features such as social network links. FIG. 14 presents an illustrative embodiment of supplemental content of an in-show purchase of items with accompanying presentation features. FIG. 15 presents an illustrative embodiment of supplemental content associated with an impulse purchase illustration with accompanying presentation features. FIG. 16 presents an illustrative embodiment of supplemental content in the form of coupons with accompanying presentation features. FIG. 17 presents an illustrative embodiment of supplemental content of an advertisement request by a sponsor with accompanying presentation features.

Figure 18:
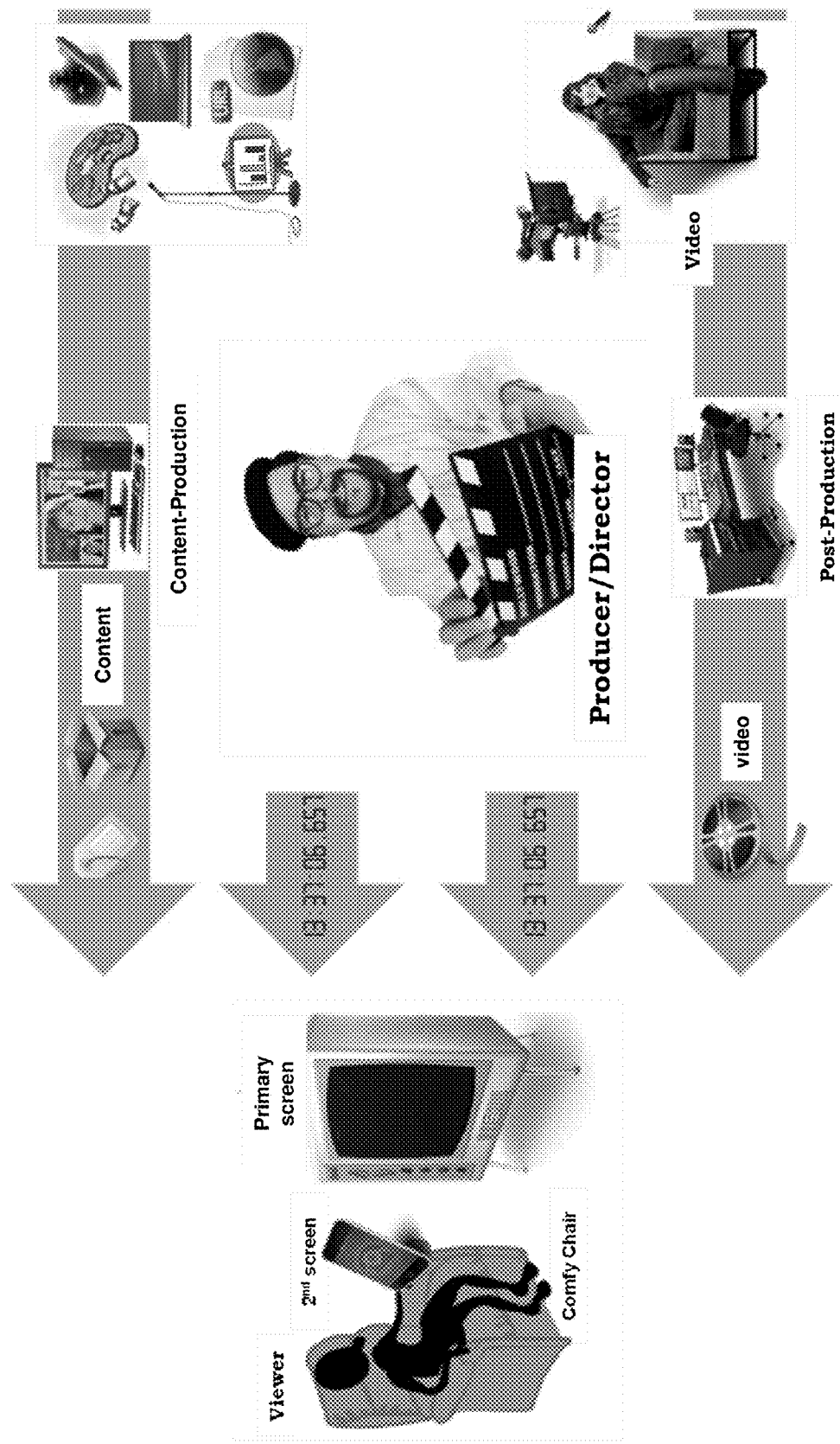
FIG. 18 depicts an illustrative embodiment of a production environment for content according to the method of FIG. 7.

FIG. 18 depicts an illustrative embodiment of a production environment for primary and supplemental content. Content production can arise from content authors, which can represent producers of high value content, or consumers or subscribers who author their own content. Post-producers of the authored content can choose to insert tags at different segments of the authored content. The post-producers can be the authors of the media program, sponsors of the media program, or other suitable third parties (such as members of a social network).

Referring back to FIG. 7, in one embodiment, a party can request insertion of tags in the media program. To accommodate this feature, the server 130 or another apparatus (such as a DVR of a consumer, or other delay equipment used by national broadcasters) can add a presentation delay to the media program in order to provide sufficient time for the insertion of tags. This embodiment can be useful to commentators of sports events who wish to present supplemental content such as diagrams superimposed on a recorded segment to describe a play during a football game. This embodiment can also be used by consumers/subscribers who wish to present to a social network supplemental content while viewing a media program. In the case of a consumer/subscriber injection of tags, a DVR feature of the media processor 106 can be used to present a delay in the media program for transmitting tags with the delayed media program to other media processors of a social network with or without the assistance of the server 130.

Upon reviewing the aforementioned embodiments, it would be evident to an artisan with ordinary skill in the art that said embodiments can be modified, reduced, or enhanced without departing from the scope of the claims described below. For example, method 700 can be modified to monitor consumption behavior of the supplemental content. The monitored consumption can take place at the media processor 106 and reported to the server 130, can be monitored at the server 130 based on requests received, or combinations thereof. The consumption behavior can also be classified by temporal characteristics of the tags, location of the consumer, demographic data associated with the consumer, device profile of the viewing device utilized by the consumer, or any single instance or combination thereof. The consumption behavior can also extend to any depth of content navigation explored by consumers. The consumption behavior can be reported to the sponsors or authors of the supplemental content to enable these parties to further improve their means to target consumers. Service providers of the services of server 130 can charge fees to consumers and/or to suppliers of the supplemental content. Fees can be fixed fees or variable fees charged by, for example, consumer clicks to access supplemental content, frequency of access of supplemental content by viewing devices, and so on.

In another embodiment, method 700 can be adapted so that the server 130 detects that the tag is being received from a DVR and thereby determines that the tag is associated with recorded content. The DVR can be an integral part of the media processor 106 or communicatively coupled to the media processor 106. The tag request submitted to the server 130 by the viewing device 512 or the media processor 106 can include an indicator or message that identifies the DVR as the source for the tag.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 19 depicts an exemplary diagrammatic representation of a machine in the form of a computer system 1900 within which a set of instructions, when executed, may cause the machine to perform any one or more of the methods described above. One or more instances of the machine can operate, for example, as the server 130, media processor 106, media devices 108, 116, the CDs of FIG. 2, and other devices of FIGS. 1-5. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1900 may include a processor (or controller) 1902 (e.g., a central processing unit (CPU), a graphics processing unit (GPU, or both), a main memory 1904 and a static memory 1906, which communicate with each other via a bus 1908. The computer system 1900 may further include a video display unit 1910 (e.g., a liquid crystal display (LCD), a flat panel, or a solid state display. The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a tangible computer-readable storage medium 1922 on which is stored one or more sets of instructions (e.g., software 1924) embodying any one or more of the methods or functions described herein, including those methods illustrated above. The instructions 1924 may also reside, completely or at least partially, within the main memory 1904, the static memory 1906, and/or within the processor 1902 during execution thereof by the computer system 1900. The main memory 1904 and the processor 1902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
   a processing system including a processor; and
   a memory that stores executable instructions that, when executed by the processing system, facilitate performance of operations comprising:
   receiving, from a media processor, a first tag retrieved from a closed captioned stream of an original media program presented by the media processor;
   identifying a plurality of records associated with the first tag;
   determining whether the first tag received from the media processor is associated with recorded content or current broadcast content based on whether a time of day of receipt of the first tag overlaps with a scheduled viewing time period for the original media program in a presentation schedule of a media content source, wherein the recorded content is provided by a recording device associated with the media processor, and wherein the current broadcast content comprises scheduled content;
   determining a device profile of a viewing device;
   selecting a record from the plurality of records according to the determining whether the first tag is associated with recorded content or current broadcast content and according to resources of the viewing device identified in the device profile, wherein the resources of the viewing device comprise a presentation resolution, audio resources, software applications used by the viewing device, or a combination thereof;
   transmitting content information retrieved from the record to the viewing device, the viewing device being communicatively coupled to the media processor for presenting first supplemental content differing from the original media program, wherein the first supplemental content is presented at the viewing device in accordance with the first tag;
   receiving a signal from the viewing device requesting insertion of a second tag into the original media program, wherein the signal is generated in response to user input at the viewing device;
   adding a presentation delay to the original media program to facilitate insertion of the second tag, thereby generating a delayed version of the original media program; and
   inserting the second tag into the closed captioned stream of the delayed version of the original media program, thereby facilitating presentation of second supplemental content by other viewing devices communicatively coupled to other media processors in accordance with the second tag,
   wherein the delayed version of the original media program is transmitted with the second tag to the other media processors.

2. The server of claim 1, wherein the determining further comprises comparing the scheduled viewing time of the original media program with the time of day of receipt of the first tag, wherein determining that the original media program is being presented during the scheduled viewing time indicates an overlap of the scheduled viewing time period of the original media program with the time of day of receipt of the first tag and indicates current broadcast content, and wherein the current broadcast content is transmitted by equipment remotely located from the media processor.

3. The server of claim 1, wherein the operations further comprise determining a location of the viewing device, and wherein the selecting further comprises selecting the record according to the location.

4. The server of claim 1, wherein the operations further comprise determining a demographic profile of the user, and wherein the selecting further comprises selecting the record according to the demographic profile of the user.

5. The server of claim 1, wherein the content is derived from the content information, and wherein the operations further comprise:
   monitoring consumption of media content including the original media program by the media processor; and
   transmitting to equipment of a content provider information associated with the consumption.

6. The server of claim 5, wherein the operations further comprise charging the content provider a service fee for transmitting the information to the equipment of the content provider.

7. The server of claim 1, wherein the second supplemental content is provided by the viewing device, and wherein the delayed version of the original media program, the second tag and the second supplemental content are transmitted to the other media processors via a network.

8. The server of claim 7, wherein the network comprises a social network.

9. A non-transitory machine-readable storage medium, comprising executable instructions that, when executed by a processing system including a processor, facilitate performance of operations comprising:
   receiving from a communication device a first tag retrieved from a closed captioned stream of an original media program;
   identifying a plurality of records associated with the first tag;
   determining whether the first tag is associated with recorded content or current broadcast content from a comparison of a time of day of receipt of the first tag and a presentation schedule of the original media program, based on whether a scheduled viewing time period for the original media program in the presentation schedule of a media content source overlaps with the time of day of receipt of the first tag, wherein the recorded content is provided by a recording device associated with the communication device, and wherein the current broadcast content comprises scheduled content;
   determining a device profile of a viewing device communicatively coupled to the communication device;
   selecting a record from the plurality of records according to the determining and according to resources of the viewing device identified in the device profile, wherein the resources of the viewing device comprise a presentation resolution, audio resources, software applications used by the viewing device, or a combination thereof;
   transmitting content information retrieved from the record to the viewing device, thereby facilitating presentation of first supplemental content at the viewing device in accordance with the first tag;
   receiving a signal from the viewing device requesting insertion of a second tag into the closed captioned stream, wherein the signal is generated in response to user input at the viewing device; and adding a presentation delay to the original media program to facilitate insertion of the second tag, thereby generating a delayed version of the original media program; and inserting the second tag into the closed captioned stream of the delayed version of the original media program, thereby facilitating presentation of second supplemental content by other viewing devices communicatively coupled with other communication devices in accordance with the second tag, wherein the delayed version of the original media program is transmitted with the second tag to the other communication devices.

10. The non-transitory machine-readable storage medium of claim 9, wherein the original media program is received by a set-top box, wherein the set-top box provides the communication device access to the closed captioned stream, wherein the determining further comprises comparing the scheduled viewing time period of the original media program with the time of day of receipt of the first tag, and wherein determining that the original media program is being presented during the scheduled viewing time period of the original media program indicates an overlap of the scheduled viewing time period of the original media program with the time of day of receipt of the first tag and indicates current broadcast content.

11. The non-transitory machine-readable storage medium of claim 10, wherein a message supplied with the first tag that indicates a type of device presenting the original media program identifies whether the set-top box is presenting the original media program from a recorded media program or a content stream received by the set-top box from equipment of a media source remotely located from the set-top box.

12. The non-transitory machine-readable storage medium of claim 9, wherein the operations further comprise receiving location information from the viewing device, and wherein the selecting further comprises selecting the record based on the location information.

13. The non-transitory machine-readable storage medium of claim 9, wherein the operations further comprise determining a demographic profile of the user, and wherein the selecting further comprises selecting the record based on the demographic profile of the user.

14. The non-transitory machine-readable storage medium of claim 9, wherein the operations further comprise transmitting to the communication device parental controls to prevent access to content associated with a tag retrieved by the communication device, or preventing the communication device from accessing content associated with the first tag according to the parental controls.

15. The non-transitory machine-readable storage medium of claim 9, wherein the operations further comprise recording a service fee for transmitting the content information to the viewing device or for detecting access by the viewing device of the first supplemental content.

16. A method, comprising:
transmitting, by a first processing system including a first processor to a second processing system including a second processor, media content comprising a first tag retrieved by the first processing system from a closed captioned stream associated with an original media program that is received by the first processing system;

identifying, by the second processing system, a plurality of records associated with the first tag;

determining, by the second processing system, whether the first tag is associated with recorded content or current broadcast content, according to whether a scheduled presentation time period in a presentation schedule of the original media program overlaps with a time of day of receipt of the first tag, wherein the recorded content is provided by a recording device associated with the first system, and the current broadcast content comprises scheduled content;

determining, by the second processing system, a device profile of a viewing device communicatively coupled to the second processing system;

selecting, by the second processing system, a record from the plurality of records according to the determining whether the first tag is associated with recorded content or current broadcast content, and according to resources of the viewing device identified in the device profile, wherein the resources of the viewing device comprise a presentation resolution, audio resources, software applications used by the viewing device, or a combination thereof;

transmitting, by the second processing system, to the viewing device content information retrieved from the record selected from the plurality of records, thereby facilitating presentation of first supplemental content at the viewing device in accordance with the first tag;

receiving, by the second processing system, a signal from the viewing device requesting insertion of a second tag into the original media program, wherein the signal is generated in response to user input at the viewing device; and adding, by the second processing system, a presentation delay to the original media program to facilitate insertion of the second tag, thereby generating a delayed version of the original media program; and inserting the second tag into the closed captioned stream of the delayed version of the original media program, thereby facilitating presentation of second supplemental content by other viewing devices communicatively coupled to a plurality of media processors in accordance with the second tag, wherein the delayed version of the original media program is transmitted with the second tag to the media processors.

17. The method of claim 16, wherein the determining further comprises comparing the scheduled presentation time period of the original media program with the time of day of receipt of the first tag, and wherein determining that the original media program is being presented during the scheduled presentation time period of the original media program indicates an overlap of the scheduled presentation time period and the time of day of receipt of the first tag and indicates current broadcast content.

18. The method of claim 17, wherein the second supplemental content is provided by the viewing device, and wherein the delayed media program, the second tag and the second supplemental content are transmitted to the other media processors via a network.

19. The method of claim 18, wherein the network comprises a social network.

* * * * *